Patented Feb. 28, 1939

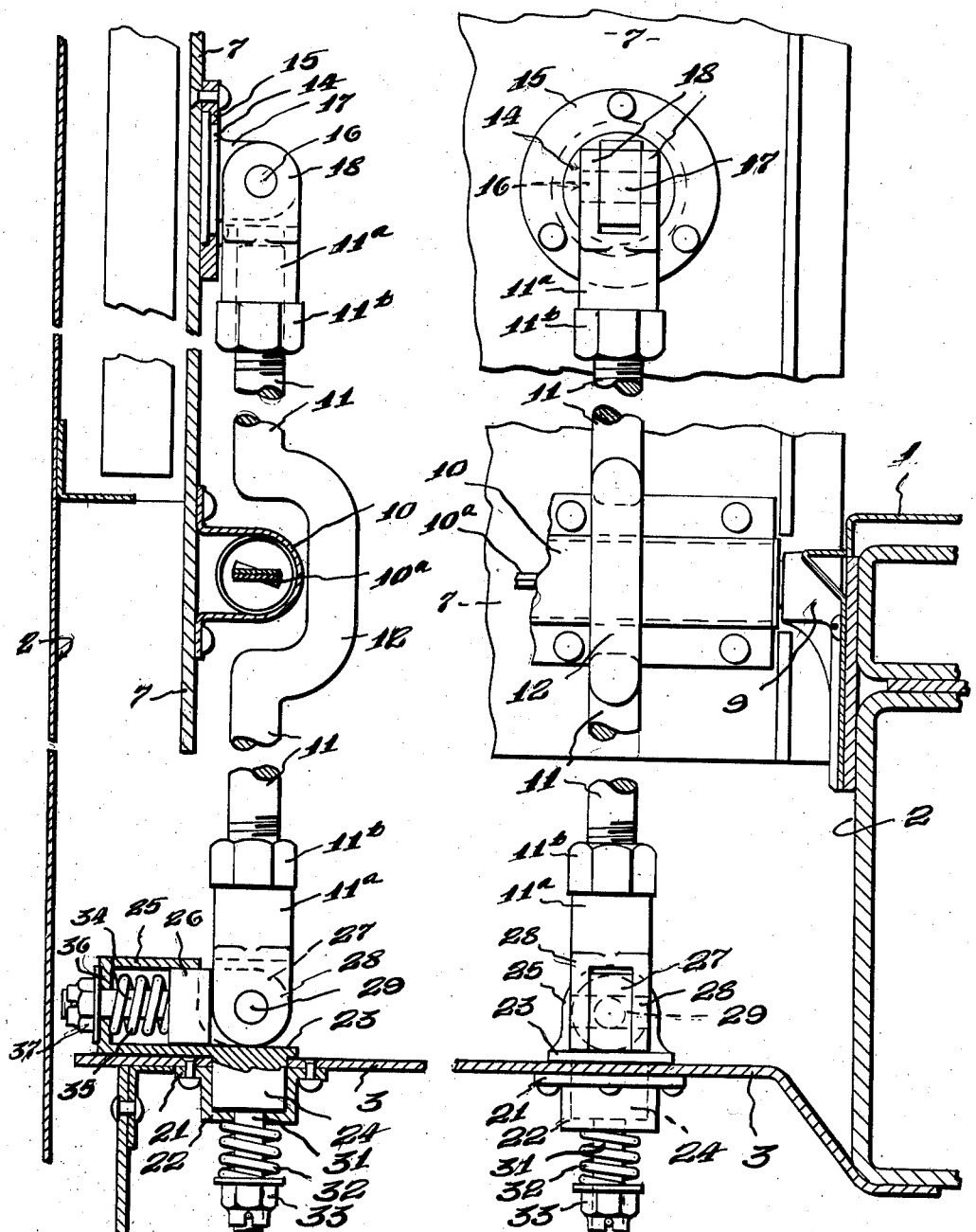

2,148,522

UNITED STATES PATENT OFFICE 2,148,522

CAR VESTIBULE TRAP DOOR AND FOLDING STEP CONSTRUCTION

Roy T. Axe, Syracuse, N. Y., assignor to The O. M. Edwards Company, Inc., Syracuse, N. Y., a corporation of New York Application April 10, 1935, Serial No. 15,639

16 Claims. (Cl. 105—430)

This invention relates to vestibule trap door and folding steps for railway cars, and has for its object a particularly simple and compact motion transmitting means between the trap door and the steps whereby the opening and closing movement of the door is synchronized with the extending and folding up of the steps or bank of steps.

It further has for its object a trap door and folding step construction, in which the steps or bank of steps are hinged and the trap door and the steps are independently counterbalanced, with the counterbalancing means of one acting in opposition to that of the other, so that when the trap door is opening under the influence of its counterbalancing means, the steps are opening or unfolding against the counterbalancing means of the steps, and vice-versa.

It further has for its object a particularly simple and efficient motion transmitting means between the trap door and the steps to synchronize the operation thereof, and a motion transmitting means consisting of a connecting rod unit or structure and including means for permitting lineal extension and contraction of the connecting rod unit during opening and closing of the trap door and the extending and folding of the steps to compensate for the differential movement of the trap door and of the steps, and further a motion transmitting means which is self-locking when the door is fully open and the steps extended, and particularly with the oppositely acting counterbalancing means tending to open the door, and fold up the steps.

It further has for its object a connecting rod structure or unit including a connecting rod proper or link and universal joints connecting the opposite ends of the connecting rod proper or link to the trap door and the steps, one of which joints has embodied therein spring means acting at a right angle to each other to permit the connecting rod unit to yieldingly extend and contract lineally.

It further has for its object the arrangement of a connecting rod unit whereby it moves into dead center line when the trap door is open and in vertical position, thus locking toggle-fashion and the steps in extended position, when the trap door is fully open.

The invention consists in the novel features and in the combinations and constructions hereinafter set forth and claimed.

In describing this invention, reference is had to the accompanying drawings in which like characters designate corresponding parts in all the views.

Figure 3 is a detail elevation of the connecting rod unit and contiguous parts.

Figure 4 is an elevation looking to the left in Figure 3.

Figure 5 is an enlarged fragmentary detail view showing the mounting of the spring barrel for the steps.

Figure 1:
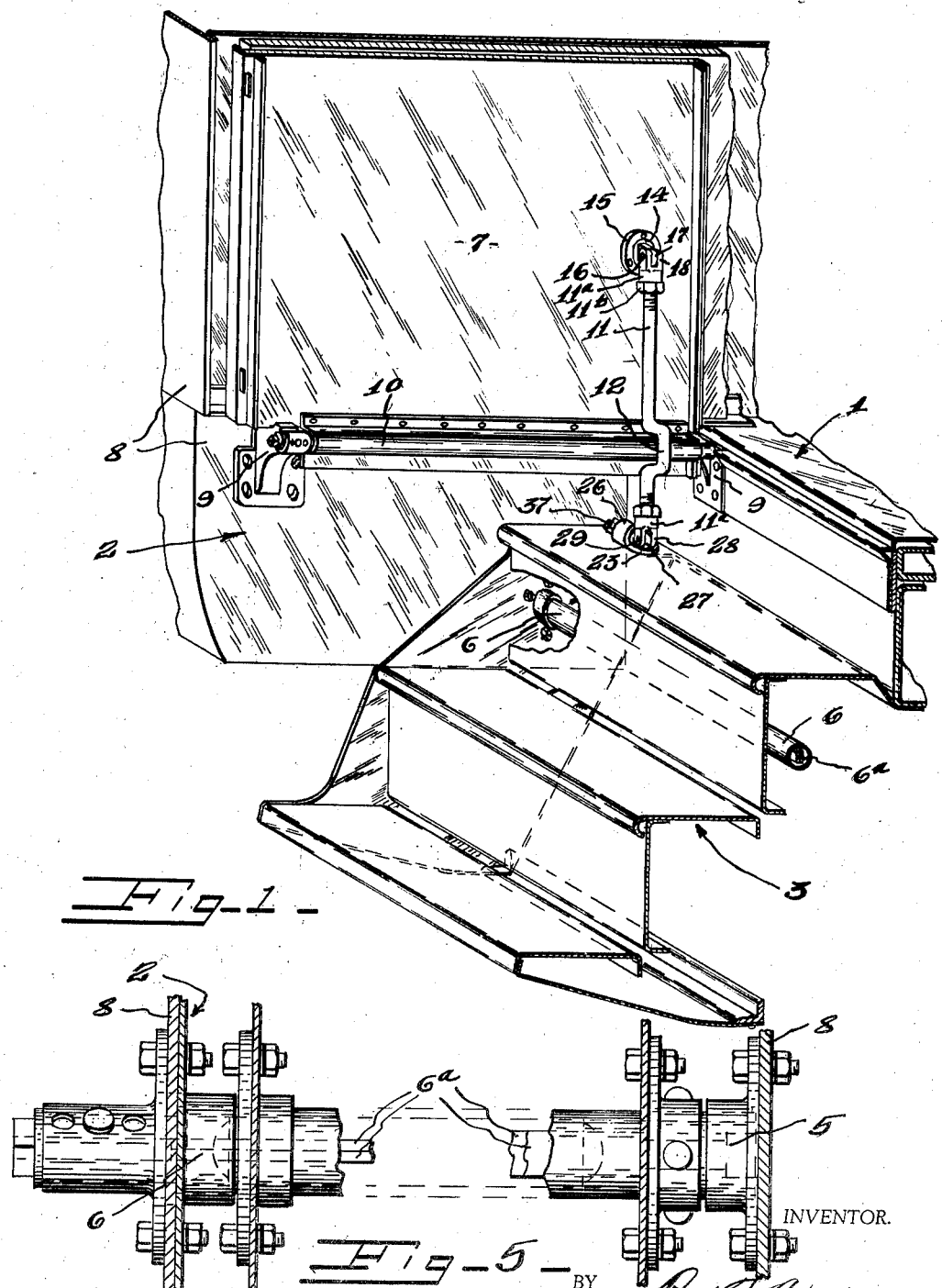
Figure 1 is a fragmentary perspective view, partly in section, of a vestibule platform of a vehicle with my trap door and folding step applied thereto.
Figure 2:
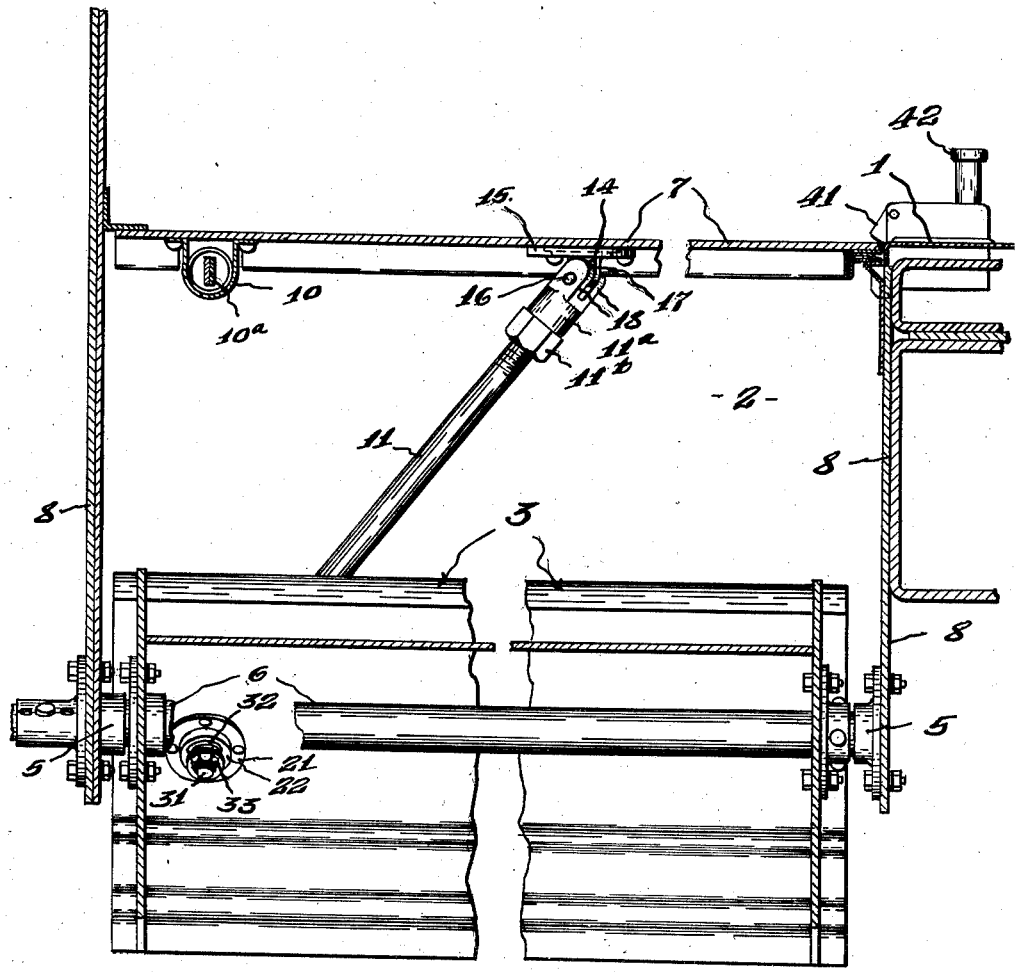
Figure 2 is a side view, partly in section, showing the position of the connecting rod unit when the trap door is closed and the steps folded up.

This trap door and folding step construction comprises generally, a step or bank of steps pivoted or hinged to the platform in the step passageway thereof to swing downward on its axis into operative or extended position and upward about its axis into a folded position, a trap door hinged to the platform to close over the step passage and cover the steps when folded and to lie flush with the platform and movable into an upright position, and motion transmitting means between the trap door and the steps to synchronize the movement thereof, both the platform and the steps being counterbalanced or partly counterbalanced or over-balanced by counterbalancing springs which act in opposition to each other, the counterbalancing spring of the trap door tending to open it and the counterbalancing spring of the steps tending to fold them up, so that when the trap door is being opened, under the influence of its counterbalancing spring, the steps are being unfolded or extending downward and outward and its spring means is being tensioned, and when the trap door is being closed, its counterbalancing spring is being tensioned and the steps are folding up under the reaction of their counterbalancing springs. This results in an easy opening and closing operation of the trap door and extending or unfolding and folding operation of the bank of steps.

I designates generally the platform of the vestibule of a railway car formed with a step passage 2. 3 designates the bank of steps hinged at 4 to the platform structure through suitable brackets as 5 and a spring barrel 6, the axis of the steps extending in a direction lengthwise of the platform. 6ª is one form of tortion spring used to counterbalance the steps.

7 designates the trap door hinged to the platform structure 8 through suitable brackets 9 and a barrel 10 in which is located a tortion spring 10ᵃ. The axis of the trap door is preferably arranged above the axis of the steps and in a horizontal plane at a right angle to the vertical plane of the axis of the bank of steps 3. The bank of steps is located in the passageway 2 and the trap door hinged to the platform at one side of the passageway in position to open and close the passageway over the steps. The under or rear sides of the steps are so shaped as to conform to the stream lining of the car body when the steps are folded into the passageway, and the trap door is closed.

The hinge construction and counterbalancing spring mechanism of the trap door and of the steps per se form no part of this invention, but the hinge spring mechanism is substantially as shown in Edwards Patent No. 781,643 dated February 7, 1905, the spring being adjustable as to tension in a manner analogous to that shown in this patent. Also, for other illustrations, see Axe Patent No. 1,138,070—March 4, 1915 and Chaffee Patent No. 1,140,951—May 25, 1915. The counterbalancing spring for the bank of steps is substantially that heretofore used with vestibule trap door constructions.

One feature of this invention is that the springs of the counterbalancing means of the trap door and the bank of steps are tensioned to act oppositely to each other.

The motion transmitting means between the trap door and the bank of steps is arranged to be out of the way of the passengers and to be self-locking when the trap door is opened to lock the steps from the tendency to fold under the reaction of their counterbalancing springs 6ᵃ, and hence lock the steps unfolded or extended. This means comprises a connecting rod structure or unit including a link connected by universal joints to the trap door and to the bank of steps, this unit including spring means permitting lineal extension and contraction of the connecting rod unit during the opening and closing of the trap door and the extending and folding of the step unit. The spring means compensates for the differential pivotal movement of the opposite ends of the connecting rod due to the fact that it is mounted on different axes and that its ends have different arcuate movements when the trap door is being opened and closed and the steps extended and folded. This connecting rod structure or unit includes a link 11 and universal joints connecting the opposite ends of the link to the trap door and to the step structure. One of these universal joints includes spring means acting in a plurality of directions for permitting the unit to extend lineally when the trap door is being opened and the step being extended, and then also, when the trap door is closed and approaching its closed position and the steps closing and approaching their folded up position. During such operations, it will be apparent that the end of the link attached to the steps moves in an arc located in a plane extending at a right angle to the arc of movement of the upper end of the link. Also, this link is arranged to move into a self-locking position or into a vertical dead center line when the trap door is fully opened and one of these spring means tends to facilitate the toggle locking effect of the link when it is moved into dead center line or beyond dead center line. By "dead center line" is meant a line extending through the pivotal connections between the link and the trap door and the steps when the trap door is open. The link is here shown as formed with an offset 12 for receiving the spring barrel 10 when the trap door is open.

As here illustrated, the link 11 is connected through spring means to the step unit to permit lineal extension and contraction of the link during the opening and closing of the trap door and extending and folding up of the step. The universal joint connecting one end of the link 11 to the trap door, as here shown, comprises a bracket 14 swivelled in a bearing plate 15 secured to the inner face of the trap door and pivoted at 16 to the upper end of the link 11.

As shown, the bracket is formed with a hinge leaf 17 extending between hinge leaves 18 at the upper end of the link 11 (Figures 3 and 4). The other end of the link 11, that is, the lower end, when the trap door is open, is connected to the bank of steps 3 through a universal joint having a yielding action to permit lineal extension and contraction of the link. This universal joint, as here shown, includes a plate 21 secured to the under side of one of the treads of one of the steps and formed with a barrel or socket 22, a second plate 23 mounted on the upper side of the tread of said step and having a cylindrical head 24 slidably and rotatably or swivelly mounted in the barrel 22, the plate 23 being also formed with a barrel 25 on the upper side thereof arranged in a right angle to the barrel 22 and in which is swivelly and slidably mounted a plunger 26 having a hinge leaf 27 which is embraced by hinge leaf 28 at the lower end of the link 11. A hinge or pivot pin 29 extends through the hinge leaves 27, 28. The bearing or head 24 is provided with a stem 31 extending beyond the end of the barrel 22 and a compression spring 32 is interposed between the end of the barrel 22 and an adjusting nut 33 at the lower end of the stem 31. Likewise, the plunger 26 swivelly and slidably mounted in the barrel 25 is provided with a similar stem 34 and a compression spring 35 interposed between the plunger 26 and the head 36 of the barrel 25. A nut 37 threads on the end of the stem 34 to hold the parts from displacement. The hinge leaves 18 and 27 are provided on heads 11ᵃ which thread on opposite ends of the link 11 and held in their adjusted position by nuts 11ᵇ. The heads are adjusted to give the link unit an initial adjustment for the particular installation or to compensate for small variations.

The springs 32 and 35 also act as compensators to equalize for differential movements in the opening and closing of the trap door and the steps, that is, to permit further movement of one of the elements connected by the connecting rod 11, after the other has been limited in its movement by being moved to completely closed or completely open position. In other words, in the illustrated embodiment of the invention, the spring 32 compresses and serves to permit further movement of the trap door 7 into self-locking open position, after the steps 3 have reached their extended or open position, and the spring 35 permits the trap door 7 to be completely closed, after the steps have moved to completely closed or folded position. When the steps have reached extended position, as shown in Figure 1, they are limited in their movement by their upper edge engaging the platform structure, as shown in Figure 1, and similarly when the steps 3 have been moved to closed position, the outer end of the steps abuts against the platform structure. At this time, the door is not completely closed, but the compression spring 35 permits additional movement of the door into closed position. The connecting rod structure is connected to the steps or the tread of the topmost step, as shown in Figure 1, between the vertical plane of the axis of the spring barrel 6 or vertical plane of the axis of the steps and the inner edge of the steps. Thus, the pull of the connecting rod structure 11, when the trap door is moved to its final self-locking position tends to hold the steps firmly in their extended position. By reason of this location of the pivotal or universal joint action between the connecting rod 11 and the steps, the equalizing spring 35 being under compression, when the steps are closed, tends to firmly hold the steps against chattering or vibration in its closed or folded position.

During opening of the trap door and the unfolding or opening of the steps, the link 11 can extend and contract lineally. During the first part of the opening movement, while the link is moving upwardly against the compressing spring 35, and as the link moves upwardly toward a vertical line, the link can extend lineally, due to the spring 32, and as the link moves into the dead center line L (Figure 3), the spring is reacting and tends to hold the steps in extended position against being raised by the counterbalancing spring 6ª. Incidentally, the link locks the trap door in wide open position. The reverse of this operation takes place during the closing of the trap door and the folding up of the steps.

The trap door is locked in its closed position in the usual manner, that is, by the usual trip latch 41. The lock for latching the trap door closed is substantially the same as the locks heretofore used for many years with vestibule trap doors, it being tripped by stepping on an operating member 42, so that the spring of the trap door is free to react to lift or partly lift or open the trap door. When the operating member is depressed by stepping on it, the latch 41 is withdrawn to release the trap door through any well known mechanism. The lock here used, insofar as locking the trap door is concerned, is generally the same as that shown in Chaffee Patent No. 1,248,806 issued December 4, 1917. Any other well known construction of lock for vestibule trap doors may be used.

As before stated, when the trap door is closed, the bank of steps is folded up and the lower or outer face of the bank of steps is shaped to conform to the stream lining of the car body. When the operating member 42 for the trap door latch is depressed, the trap door opens or partly opens into a position where it can be easily lifted to full open position. During this operation, the counterbalancing spring of the trap door assists in the opening against the opposing effect of the counterbalancing spring of the steps. When the trap door is fully opened, the link 11 moves into dead center or self-locking position, and during the opening and locking movement, the springs 34 and 32 permit a lineal extension and contraction of the link 11 and compensate for the differential movements of the link, due to the different directions of the arcs of movement of the upper and lower ends of the link. To close the trap door and fold up the steps, the trap door is given a starting impulse, thus moving the link 11 out of the dead center or self-locking position and permitting the counterbalancing spring 6ª of the steps to react. Owing to the starting impulse given to the trap door and the reaction of the counterbalancing spring of the steps, the trap door can be closed to full position with minimum effort, while the steps are folding to folded position under the reaction of the counterbalancing spring.

This trap door and folding step construction is operable with minimum effort both in opening and closing, due to the opposing counterbalancing of the trap door and the steps and owing to the locking movement of the link into a vertical dead center line, the steps are firmly held in operative extended position from reaction of the counterbalancing spring.

What I claim is:—

1. In a vestibule trap door and folding step construction for railway cars, the combination of a platform structure formed with a step passage, steps hinged to the platform structure in said passage on a horizontal axis and movable downward from a folded into operative position and a trap door hinged to the platform structure on a horizontal axis and arranged to cover and uncover the passage in which the steps are located, means for counterbalancing the trap door and the steps oppositely relatively to each other, so that the trap door tends to open under its counterbalancing means and the steps tend to fold up under their counterbalancing means, and motion transmitting means between the trap door and the steps.

2. In a vestibule trap door and folding step construction for railway cars, the combination of a platform structure formed with a step passage, steps hinged to the platform structure in said passage on a horizontal axis and movable downward from a folded into operative position and a trap door hinged to the platform structure on a horizontal axis and arranged to cover and uncover the passage in which the steps are located, means for counterbalancing the trap door and the steps oppositely relatively to each other, so that the trap door tends to open under its counterbalancing means and the steps tend to fold up under their counterbalancing means, motion transmitting means between the trap door and the steps, and means for locking the trap door in closed position and through the motion transmitting means locking the steps in folded position.

3. In a vestibule trap door and folding step construction for railway cars, the combination of a platform structure formed with a step passage, steps hinged to the platform structure in said passage on a horizontal axis and movable downward from folded into operative position, and a trap door hinged to the platform structure on a horizontal axis and arranged to cover and uncover the passage in which the steps are located, means for counterbalancing the trap door and the steps, and motion transmitting means between the trap door and the steps to extend the steps to operative position, when the trap door is opened, said motion transmitting means including a part operable to transmit motion from the door to the steps, said motion transmitting part being movable into a position whereby it locks the steps in extended position when the door is open.

4. In a vestibule trap door and folding step construction for railway cars, the combination of a platform structure formed with a step passage, steps hinged to the platform structure in said passage on a horizontal axis and movable downward from a folded into operative position and a trap door hinged to the platform structure on a horizontal axis and arranged to cover and uncover the passage in which the steps are located, means for counterbalancing the trap door and the steps oppositely relatively to each other, so that the trap door tends to open under its counterbalancing means and the steps tend to fold up under their counterbalancing means, and motion transmitting means between the trap door and the steps, said motion transmitting means comprising a connecting rod structure including a link articulated at its ends to the trap door and to the steps and movable into an upright center line passing through its point of connection to the door and steps when the trap door is open and the steps in extended position.

5. In a vestibule trap door and folding step construction for railway cars, the combination of a platform structure formed with a step passage, a bank of steps hinged to the platform structure in the passage on a horizontal axis, a trap door hinged to the platform structure at one side of the step passage on a horizontal axis extending at a right angle to the vertical plane of the axis of the steps, means for counterbalancing the steps and tending to open the trap door, additional means independent of the former means for counterbalancing the trap door and tending to fold up the steps, and a motion transmitting connection between the trap door and the steps, whereby when the trap door is opened, the steps are moved into operative position against the counterbalancing means, and when the trap door is closed, the steps are raised out of operative position by the counterbalancing means.

6. In a trap door and folding step construction for railway cars, the combination of a platform structure formed with a step passage, steps hinged to the platform structure in the passage on a horizontal axis, a trap door hinged to the platform structure at one side of the step passage on a horizontal axis extending at a right angle to the vertical plane of the axis of the steps, and a connecting rod structure including a link connected by universal joints directly to both the trap door and the steps, said connecting rod structure including spring means permitting the connecting rod structure to elongate and contract, as the trap door closes and opens and the steps fold and open about their axes.

7. In a trap door and folding step construction for railway cars, the combination of a platform structure formed with a step passage, steps hinged to the platform structure in the passage on a horizontal axis, a trap door hinged to the platform structure, and a connecting rod structure connecting the trap door and the steps and connected by universal joints directly to both the trap door and the steps, said connecting rod structure including spring means for compensating for the differential pivotal movement of the trap door and the steps during their opening and closing movement.

8. In a vestibule trap door and folding step construction for railway cars, the combination of a platform structure formed with a step passage, steps hinged to the platform structure in the passage on a horizontal axis, a trap door hinged to the platform structure on a horizontal axis, and a connecting rod structure between the trap door and the steps including a link and universal joints between the ends of the link and the door and the steps, one of said joints including a plurality of spring means acting in directions at an angle to each other to permit the connecting rod structure to elongate during opening and closing of the trap door and extending and folding of the steps and compensate for differential pivotal movement of the trap door and the steps.

9. In a trap door and folding step construction for railway cars, the combination of a platform structure formed with a step passage, two elements, one being steps hinged to the platform structure in said passage on a horizontal axis and movable downward from folded into open position, and the other a trap door hinged to the platform structure on a horizontal axis and arranged to cover and uncover the passage in which the steps are located, and motion transmitting means between the trap door and the steps operable to open and close them in synchronism, the motion transmitting means including equalizing mechanism permitting continued movement of one of said elements, after the other has reached closed position and continued movement of one of said elements, after the other element has reached open position.

10. In a trap door and folding step construction for railway cars, the combination of a platform structure formed with a step passage, steps hinged to the platform structure in the passage on a horizontal axis, a trap door hinged to the platform structure on a horizontal axis, and spring means tending to open the trap door and move the steps from open to closed position, and motion transmitting means between the trap door and the steps to open the steps when the trap door is opened, said motion transmitting means including spring means for permitting the trap door to continue its movement when the steps are open and to continue its movement into closed position, after the steps have been moved to closed position.

11. In a trap door and folding step construction for railway cars, the combination of a platform structure formed with a step passage, steps hinged to the platform structure in said passage on a horizontal axis and movable downwardly from folded position into open position, a trap door hinged to the platform structure on a horizontal axis and arranged to cover and uncover the passage in which the steps are located, spring means acting to open the trap door, motion transmitting means between the trap door and the steps to transmit the movement of the door to the steps, said motion transmitting means including equalizing mechanism operable to permit continued opening movement of the door after the steps have reached their open position and continued closing movement of the door after the steps have reached closed position.

12. In a trap door and folding step construction for railway cars, the combination of a platform structure formed with a step passage, a step element hinged to the platform structure in said passage on a horizontal axis and movable downwardly from folded position into extended position, a trap door element hinged to the platform structure on a horizontal axis and arranged to cover and uncover the passage in which the step element is located, spring means acting to open the trap door element, and a connecting rod structure including a link connected by universal joints directly to both the trap door and the steps, said connecting rod structure including means permitting movement of one of said elements during its opening movement, after the other element has reached open position and also continued closing movement of one element, after the other element has reached closed position.

13. In a trap door and folding step construction for railway cars, the combination of a platform structure formed with a step passage, steps hinged to the platform structure in the passage on a horizontal axis located between the inner and outer ends of the steps, a trap door hinged to the platform structure at one side of the step passage on a horizontal axis and a connecting rod structure connected to the trap door and to the steps, the connecting rod structure including a link connected by universal joints directly to both the trap door and the steps, it being connected to the steps between the vertical plane of the axis of the steps and the inner edge of the steps, the steps engaging with the platform structure at their outer and inner edges, when in their closed and open positions, the connecting rod structure also including equalizing springs permitting additional movement of the trap door after the steps have reached their open position, and after they have reached their closed position.

14. A folding step and trap door assembly for cars comprising, a flight of steps pivoted as a unit to said car, means forming a part of said unit and adapted to form a part of the car side when the steps are inoperative, a trap door pivoted to said car to be raised and lowered, means interconnecting said trap door and steps, said means being of such a length as to cause the step unit to reach its inoperative position prior to the full lowering of the trap door and means permitting the final lowering of the trap door independently of said step unit.

15. A folding step and trap door assembly for cars comprising a flight of steps unit pivoted to said car, a trap door unit pivoted to said car to be raised and lowered, a unit interconnecting said trap door and step units, the last unit being of such a length as to cause the step unit to reach its inoperative position prior to full closing of the trap door unit, and yielding means embodied in one of said units permitting final closing of the trap door unit relatively to the step unit.

16. A folding step and trap door assembly for cars comprising a flight of steps unit pivoted to said car, a trap door unit pivoted to said car to be raised and lowered, a unit interconnecting said trap door and step units, the third unit being of such a length as to cause the step unit to reach its inoperative position prior to full closing of the trap door unit, and yielding means embodied in the third unit permitting final closing of the trap door unit relatively to the step unit.

ROY T. AXE.